(12) United States Patent
Meged et al.

(10) Patent No.: US 7,619,967 B2
(45) Date of Patent: Nov. 17, 2009

(54) METHOD FOR PROTECTION OF ETHERNET TRAFFIC IN OPTICAL RING NETWORKS

(75) Inventors: Michael Meged, Givatayim (IL); Idan Kaspit, Rosh Ha'ayin (IL)

(73) Assignee: ECI Telecom Ltd., Petach-Tikva (IL)

( * ) Notice: Subject to any disclaimer, the term of this patent is extended or adjusted under 35 U.S.C. 154(b) by 629 days.

(21) Appl. No.: 10/528,157

(22) PCT Filed: Sep. 11, 2003

(86) PCT No.: PCT/IL03/00743

§ 371 (c)(1),
(2), (4) Date: Mar. 17, 2005

(87) PCT Pub. No.: WO2004/028052

PCT Pub. Date: Apr. 1, 2004

(65) Prior Publication Data

US 2006/0064479 A1     Mar. 23, 2006

(30) Foreign Application Priority Data

Sep. 18, 2002    (IL)  ................................ 151796

(51) Int. Cl.
| | |
|---|---|
| G01R 31/08 | (2006.01) |
| G06F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |

(52) U.S. Cl. ...................................... 370/222; 370/221

(58) Field of Classification Search .................. 370/222, 370/221, 223, 224, 254, 406; 340/825.01, 340/895.01
See application file for complete search history.

(56) References Cited

U.S. PATENT DOCUMENTS 5,570,371 A * 10/1996 Iga .............................. 370/476
6,122,250 A * 9/2000 Taniguchi .................... 370/222

(Continued)

FOREIGN PATENT DOCUMENTS

EP       0 708 542 A2    4/1996

(Continued)

OTHER PUBLICATIONS

ITU-T Recommendation G.841, "Types and characteristics of SDH network protection architectures", (Oct. 1998), relevant pages only.

*Primary Examiner*—Ricky Ngo
*Assistant Examiner*—David Oveissi
(74) *Attorney, Agent, or Firm*—Browdy and Neimark, P.L.L.C.

(57) ABSTRACT

A method for protecting Ethernet data packets transmitted over SDH/SONET traffic in a ring-like optical network formed by a number of nodes, the method includes utilizing MS-SPRING/BLSR system for SDH/SONET traffic protection and, in case of one or more network failures that result in at least one isolated node in the network, the method comprises preventing initiation of a squelching algorithm of the MS-SPRING/BLSR system with respect to the SDH/SONET virtual containers carrying the data Ethernet packets, while ensuring that the standardized use of byte J1 is prevented with respect to the same SDH/SONET virtual containers carrying the Ethernet packets.

6 Claims, 2 Drawing Sheets

U.S. PATENT DOCUMENTS

| | | | |
|---|---|---|---|
| 6,920,603 B2 * | 7/2005 | Kimoto | 714/798 |
| 7,002,976 B2 * | 2/2006 | Dupont | 370/404 |
| 7,177,328 B2 * | 2/2007 | Miller | 370/503 |
| 2003/0026203 A1 * | 2/2003 | Manganini et al. | 370/221 |
| 2004/0109408 A1 * | 6/2004 | Mesh et al. | 370/222 |
| 2005/0041601 A1 * | 2/2005 | Kam et al. | 370/258 |

FOREIGN PATENT DOCUMENTS

| | | |
|---|---|---|
| EP | 0 949 777 A2 | 10/1999 |
| EP | 0 994 591 A2 | 4/2000 |
| EP | 1339198 A1 * | 8/2003 |
| WO | WO 02/23779 A2 | 3/2002 |

* cited by examiner

METHOD FOR PROTECTION OF ETHERNET TRAFFIC IN OPTICAL RING NETWORKS

FIELD OF THE INVENTION

The invention relates to protection of data traffic, in the form of Ethernet packets, in optical ring-like networks (so-called optical rings).

BACKGROUND OF THE INVENTION

Optical networks are originally predestined for transmission of data traffic at high bit rates. There are a number of transmission standards which were specifically developed for high speed transmission of optical signals in modern optical networks.

Synchronous Optical NETwork (SONET) and Synchronous Digital Hierarchy (SDH) describe two families of closely related and compatible standards that govern interface parameters; rates, formats and multiplexing methods; operations, administration, maintenance and provisioning for high-speed signal transmission. SONET is primarily a set of North American standards with a fundamental transport rate beginning at approximately 52 Mb/s (i.e., 51.84 Mb/s), while SDH, principally used in Europe and Asia, defines a basic rate near 155 Mb/s (to be precise, 51.84×3=155.52 Mb/s). From a transmission perspective, together they provide an international basis for supporting both existing and new services in the developed and developing countries.

For transmitting data, SDH and SONET use frame formats transmitted every 125 μs (8000 frames/sec). Because of compatibility between SDH and SONET, their basic frames are similarly structured, but differ in dimension which fact reflects the basic transmission rates of 155.52 and 51.84 Mb/s, respectively. To be more specific, a basic frame format of SDH is 9 rows of 270 bytes, or 2430 bits/frame, corresponding to an aggregate frame rate of 155.52 Mb/s. For SDH systems, the mentioned basic frame transmitted at the rate 155.52 Mb/s forms the fundamental building block called Synchronous Transport Module Level-1 (STM-1). For SONET systems, the basic frame has dimensions of 9 rows by 90 byte columns and, being transmitted at the rate 51.84 Mb/s, forms the appropriate fundamental building block called Synchronous Transport Signal Level-1 (STS-1).

Lower rate payloads (data portions transmitted at rates smaller than the basic ones) are mapped into the fundamental building blocks, while higher rate signals are generated by synchronously multiplexing N fundamental building blocks to form STM-N signals (in SDH) or STS-N signals (in SONET).

Each basic frame in SONET or SDH comprises an information portion called Information Payload and a service portion called Overhead (OH), the latter being subdivided into a number of areas of overhead bytes (for example, Path Overhead—POH, Transport Overhead—TOH) predestined for various service and control functions. One of such areas is a column of Path Overhead (POH) usually residing within the Information Payload area and comprising a plurality of bytes. POH supports performance monitoring, status feedback, signal labeling, user channel and a tracing function in a path. This overhead is added and dismantled at or near the service origination/termination points defining the path, and is not processed at intermediary nodes.

One of the important bytes of the POH is a Path Trace byte called J1. This byte is used to transmit repetitively a Path Access Point Identifier so that a path receiving terminal can verify its continued connection to the intended transmitter. In transport networks operating according to SONET, J1 is used to send a repetitive signal to form a 64 byte string (trace), while in networks utilizing SDH the repetitive signal produced by J1 byte is preferably in a format of 16 byte string (trace). However, in the SDH standard there is an option of a 64 byte free format string, and where the 16 byte format is transferred in the 64 byte field, it shall be repeated four times. The path terminating equipment (PTE), depending on the standard in use, must therefore be able to continuously compare either a 16 byte long string, or a 64 byte long string with an expected code of the J1 string (trace).

The SDH multiplexing structure, defined in ITU-T Recommendation G.707(03/96), comprises so-called virtual containers serving to combine lower rate payloads such as by mapping into these containers and adding POH. The combined payloads fitted with POH are further aligned and multiplexed in order to form an STM-N signal. The STM-N signal can be obtained either by multiplexing AU-3 signal (accepted also in SONET) by 3N, or by multiplexing N signals AU-4. AU-4 is formed by adding pointers to a VC-4 signal (virtual container level-4). Similarly, the AU-3 signal is formed from VC-3 by adding AU-3 pointers. Lower level signals TU-11, TU-12, TU-2 and TU-3, which are formed by adding respective pointers to lower level virtual containers VC-11, VC-12, VC-2 and VC-3, in their turn serve as components for composing the higher level virtual containers VC-3 or VC-4. Packet networks such as IP, Ethernet, ATM, FC (Fiber channel) operate according to protocols defining burst-like transmission of information units called packets or cells, wherein the length and contents of the packets in each specific network are predetermined by the suitable standards and protocols.

Presently, not only the modern LANs grew, but as a rule, they are now interconnected by wide area networks (WANs) which operate according to totally different protocols. That is a result of one of the trends in the modern world of communications where integration of various types of networks becomes more and more popular. For example, a communication path between two end users or providers may include both network sections utilizing packet framing (such as IP or Ethernet), and sections of optical networks such as SDH or SONET utilizing so-called virtual containers which are complex aggregated structures of digital frames.

For transmitting Ethernet packets, digital frames of SONET/SDH envelope the information comprised in the Ethernet packets (SONET/SDH is generally considered a 1st (lower) level, and Ethernet—a 2nd (higher) level.

Protection of data traffic in optical rings has been developed and standardized for the above-mentioned two accepted standards—SDH and SONET.

For optical networks transmitting SDH traffic, there exists a so-called MS-SPRING (Multiplex Section Shared Protection Ring) system of traffic protection described in an ITU-T Standard Recommendation G.841.

For the SONET optical networks, a so-called BLSR (Bi-Directional Line Switched Ring) protection system was proposed, defined in the North American Standard of Bellcor GR.1230.

The MS-SPRING system proposes two options for protecting traffic in optical rings. The first option is developed for optical rings formed by two-fiber links connecting network elements, wherein each fiber serves one of two opposite traffic directions in the ring. Half the capacity of each fiber is intended for the protection purposes. The second option is intended for rings with four-fiber links, where each direction of optical traffic between the network elements is served by two optical fibers. One of the two fibers of one and the same direction is intended for the purposes of protection.

The MS-SPRING system completely performs its functions for SDH traffic when a fiber cut occurs in the ring and the traffic should be redirected. Ethernet traffic, which is a layer 2 data traffic, can be transmitted in an optical network over SDH traffic. Usually, for carrying the Ethernet data, one may use one or more AU-4 containers forming the SDH data stream. It should be noted, that some AU-4 containers may be free of carrying the Ethernet data. In SONET networks, AU-3 containers are used for transporting the Ethernet information.

The MS-SPRING successfully copes with protecting both SDH traffic and the Ethernet traffic over SDH in the optical ring in case of a fiber cut between two adjacent network elements. In such a case each of the two network elements redirects the traffic, which should have been sent via the cut fiber, to the opposite direction and thereby the traffic forms another ring contour using the protective capacity of the fiber (fibers) assigned to the opposite direction. A case of such a fault in a two-fiber ring network is illustrated in FIG. 1a. It is assumed that each node N1 to N6 of network 10 is ADM (Add Drop Multiplexer), i.e. a network element providing for dropping some data channels to a customer (not shown) connected to the node, as well as for adding some data channels from the customer, to be transmitted to other nodes in the ring. In the case of a single fiber cut (shown as a cross) functions of the nodes are not affected.

There is another case of fault in a the ring network, called "an isolated node" that happens as a result of either a node failure, or a double fiber cut where the two fiber links surrounding one node are cut. The case of isolated node in a two-fiber ring network 20 is shown in FIG. 1b. In such a case, the MS-SPRING system, though coping with protecting the SDH traffic, is ineffective in protecting the Ethernet data.

There are two mutually interconnected reasons for that.

The first reason is that when an isolated node appears, the MS-SPRING protocol initiates a so-called squelching algorithm, according to which any traffic which originates or terminates at the isolated node should be squelched by other nodes. The traffic which is affected is the SDH virtual containers.

The second reason is that the Ethernet layer traffic enveloped in the SDH virtual container(s) must perform termination/generation operations at every node of the ring, regardless whether a particular Ethernet packet in such a container is addressed to this specific node or goes through to another node. Indeed, if one node fails, the MS-SPRING system will automatically consider all AU-4 SDH containers carrying the Ethernet traffic as terminating/originating at the faulty node, and thereby will mark them to be squelched.

Due to these two reasons, AU-4 virtual containers of SDH traffic comprising the Ethernet packets (and possibly some AU-4s which do not comprise Ethernet data but are to be added/dropped at the faulty node) will be squelched as those terminated/generated at the isolated node. It means that the task of protecting Ethernet traffic cannot be fulfilled since actually all the Ethernet data will be lost.

Yet another kind of faults is known—a so-called "isolated section"—when two (or more) fiber cuts occur in a ring network and separate from it more than one nodes. An example of such a fault is illustrated in FIG. 1c. For each part of the network between two fiber cuts, all nodes belonging to the other separated part(s) of the network constitute "isolated nodes", with all the consequences described above.

MS-SPRING in its standard version is unsuitable for protecting Ethernet traffic in the cases of occurring one or more isolated nodes in a ring, and one of solutions to protect it is to use STP (Spanning Tree Protocol) in addition to MS-SPRING. The STP protocol is a complex, high volume software tool which is capable of routing traffic in any network topology in the presence of any cases of faults. For ring networks, the STP protocol is too heavy, expensive and slow.

OBJECT OF THE INVENTION

It is therefore the object of the present invention to ensure protection of the Ethernet layer traffic, transported in ring networks by SDH/SONET layer traffic, by using possibilities of MS-SPRING system and avoiding additional complex software tools.

SUMMARY OF THE INVENTION

The above object can be achieved by providing a method for protecting Ethernet data packets transmitted over SDH/SONET traffic in a ring-like optical network formed by a number of nodes, the method includes utilizing MS-SPRING/BLSR system for SDH/SONET traffic protection and, in case of occurring at least one isolated node in the network (i.e., in case of at least one failure in the network leading to a fault of the types "isolated node" or "isolated section"), comprises:

preventing initiation of a squelching algorithm of the MS-SPRING/BLSR system with respect to the SDH/SONET virtual containers carrying the data Ethernet packets, while ensuring absence of standardized use of byte J1 in the network, with respect to the SDH/SONET virtual containers carrying the Ethernet packets.

It is to be understood that a possibility to perform the above new steps is provided in advance in a new software product cooperating with the MS-SPRING; the steps are performed indeed whenever the network detects one or more isolated nodes.

The method is most advantageous for protecting Ethernet packets in the network in case of occurring a single isolated node (i.e., a fault of the type "isolated node").

Preferably, the nodes of the network are ADM (Add Drop Multiplexer) nodes.

For the SDH traffic, the virtual containers are preferably AU-4 virtual containers. For the SONET traffic—said virtual containers are AU-3 ones.

It should be understood that when at least one isolated node is detected and the squelching is cancelled with respect to at least a portion of SDH/SONET traffic (as the invention requires), a number of trails will appear in the network, for which the transmitting node and/or the receiving node do not exist. Due to this fact, the standard mechanism of trail control, should it be performed by the byte J1 in SDH/SONET, would have the same effect as the squelching has. However, some networks may just not perform the trail control by byte J1. Therefore, in case the J3 conventional (standardized) feature is used in the network, the system serving the network should be capable of blocking or modifying this feature whenever at least one isolated node is detected.

For example, the J1 bytes of all the virtual containers carrying the Ethernet traffic can be filled by one and the same binary code word.

Alternatively, a user may be provided by a message from the system manager not to initiate J1 in SDH frames for specific trails of the Ethernet traffic.

The proposed method is very simple since it provides minimal adjustments at the SDH/SONET layer while does not require any changes at the Ethernet layer.

The method provides protection for the Ethernet traffic and does not lead to any undesired consequences in the case of "isolated node". It happens since, by banning the squelching and neutralizing the J1 functionality at the SDH/SONET layer, the method preserves all the Ethernet traffic in the ring untouched, while the Ethernet layer will then handle eliminating only those Ethernet packets which originate or terminate at the node(s) considered isolated.

It should be emphasized that the step of blocking the squelching is preferably applied only to those containers carrying the Ethernet traffic. In case the SDH traffic comprises at least one virtual container not transporting such data packets, the squelching algorithm of MS-SPRING must be active in respect of such a container (i.e., the "non-Ethernet" virtual container should be squelched if originates or terminates at the isolated node).

The byte J1 functionality is usually optional when the MS-SPRING/BLSR system with its squelching algorithm is utilized, and the virtual containers carrying the pure SDH/SONET traffic will be properly treated both under the normal conditions and in case of the occurring isolated node(s) regardless whether the J1 functionality is "on" or "off".

However, for cases when end points of the data trails are under supervision of the same network manager, the method can be performed with the following additional steps:

blocking the squelching algorithm also with respect to the virtual containers of the SDH/SONET traffic not carrying Ethernet packets, while ensuring the standardized J1 functionality for the virtual containers not carrying the Ethernet data traffic.

In any case, and in particular when the J1 functionality is used in the network, it should be neutralized for the Ethernet carrying virtual containers in the case of occurring at least one isolated node.

As has been noted before, the squelching algorithm is a part of the MS-SPRING system, responsible for throwing away components of the SDH traffic that are terminated or generated at the node detected as isolated. If, according to the proposed method, no component containers of the SDH traffic which carry Ethernet packets are squelched upon detecting one or more isolated nodes, the Ethernet packets remain in the network. How will the Ethernet layer act for eliminating those Ethernet packets which should be squelched, i.e. those which originate or terminate at the node(s) considered isolated?

To understand it, one should realize that the Ethernet packets are always provided with indication of their destination node and source node. The Ethernet packets remaining in the network will be recognized at each of the remaining nodes owing to the regular termination/generation operation, and most of them will be received at/forwarded to the respective nodes to which they are directed. Only when an Ethernet packet is indeed directed to the isolated node, it will be thrown away since, earlier or later, the termination/generation operation at a particular node will reveal the following abnormal situation: the direction from which the packet is received is the direction to which it requires to be forwarded according to the destination address.

According to another aspect of the invention, there is provided a system for protecting Ethernet data packets transmitted over SDH/SONET traffic in a communication ring-like network, which system being adapted to implement the above-described method.

Further, the Inventors propose a software product for protecting Ethernet data packets transmitted over SDH/SONET traffic in a communication ring-like network, the software product being adapted for cooperating with MS-SPRING/BLSR system for the traffic protection, and being capable of blocking a squelching algorithm of the MS-SPRING/BLSR system with respect to the SDH/SONET traffic virtual containers carrying the Ethernet data packets in case of detecting at least one isolated node in the network.

The software product comprises a so-called manager software means operative to cooperate with a network manager of said network, and a so-called node software means operative to cooperate with embedded software of the network nodes, acting together to block the squelching algorithm as defined above.

To ensure that the J1 standardized functionality is not applied to the containers carrying the Ethernet data packets, the manager should not configure the nodes to check J1. For example, this can be ensured in advance by inserting a suitable message in the additional manager software means, addressed to the manager. The message is intended to ensure that the manager does not change the default of not using the J1, or that it brings to the user's attention not to use J1 functionality if the J1 was checked before.

According to another embodiment, the manager software means can be further operative to provide the manager with a message, set in advance, to modify contents of the J1 byte of the virtual containers carrying the Ethernet data packets.

Further details of the invention will become apparent as the description proceeds.

BRIEF DESCRIPTION OF THE DRAWINGS

The invention will be described in more details with the aid of the following non-limiting drawings, in which.

DETAILED DESCRIPTION OF THE INVENTION

Figure 1A:
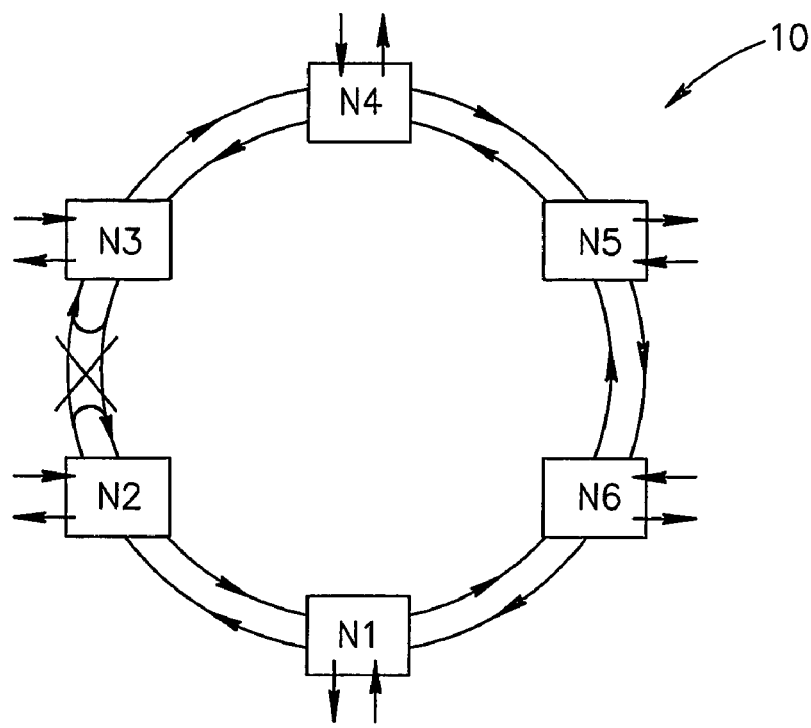
FIG. 1a illustrates a ring network with a single fiber cut.
Figure 1B:
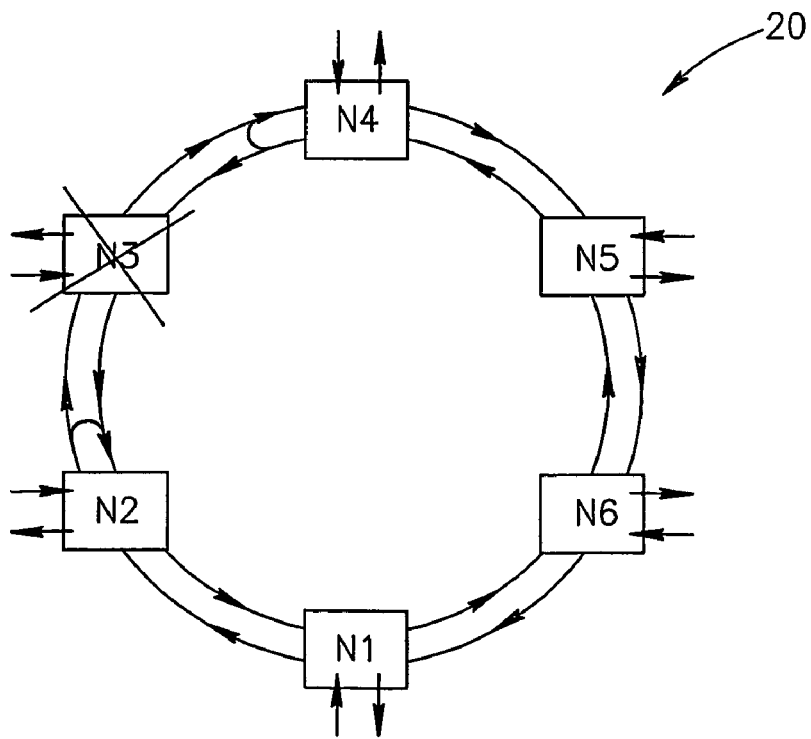
FIG. 1b illustrates a ring network with an "isolated node".
Figure 1C:
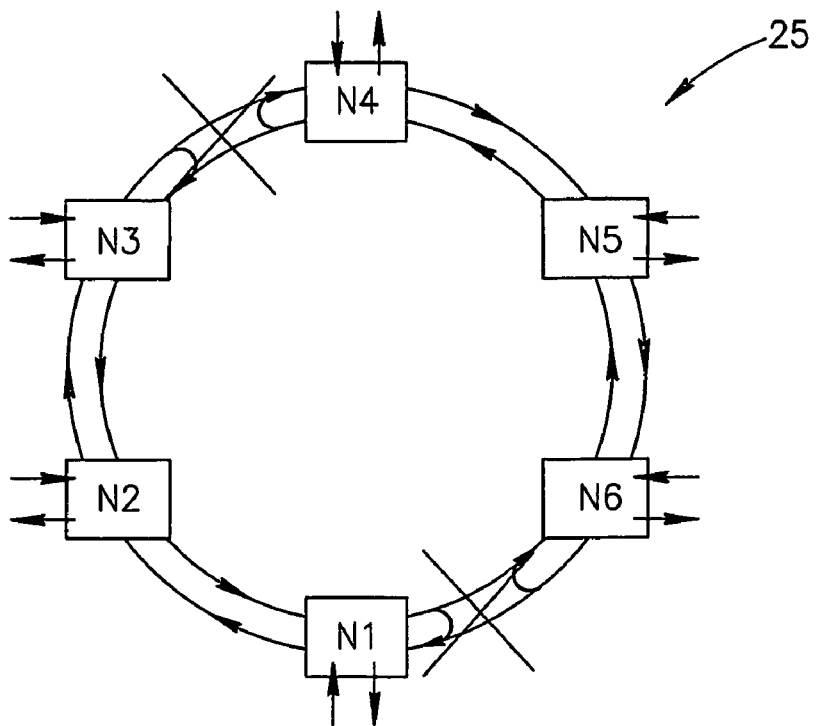
FIG. 1c illustrates a ring network with two "isolated sections".
Figure 2:
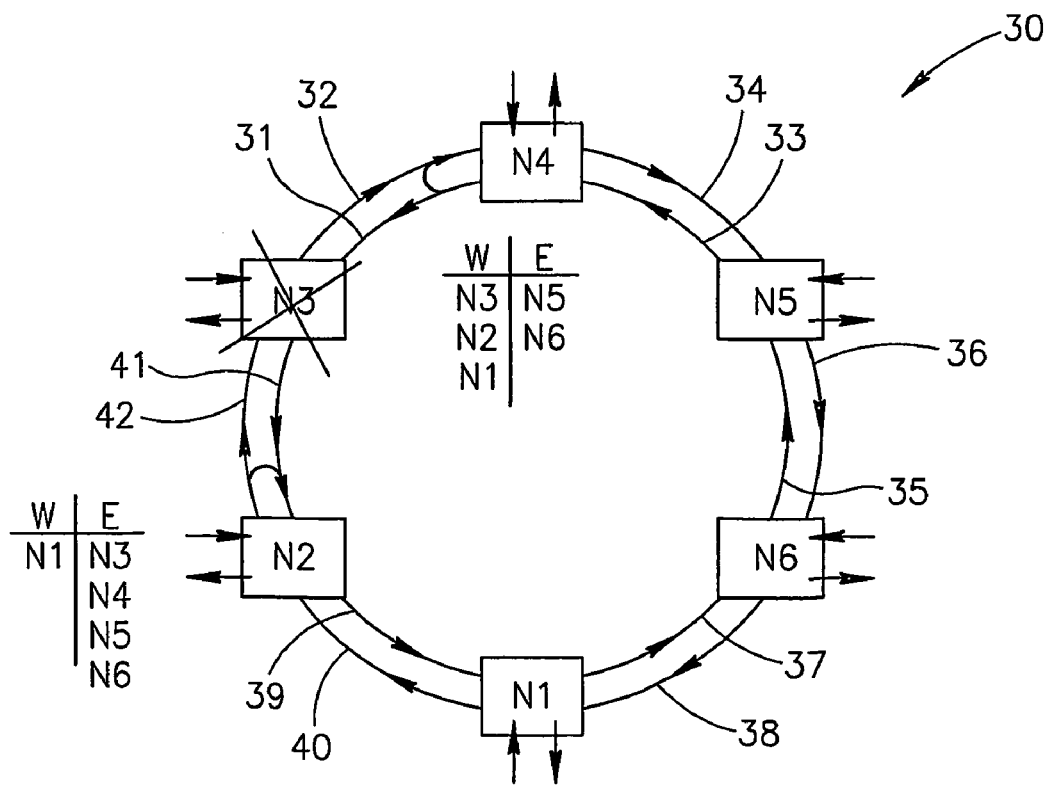
FIG. 2 illustrates a ring network similar to that shown in FIG. 1b, with schematic representation of "East-West" tables built for the nodes at the Ethernet level, for explaining how the proposed method works for the Ethernet packets.

Before referring to FIG. 2, it should be explained that while at the level of SONET/SDH all nodes are informed about the network topology (and about the failed node, if any), at the level of Ethernet the nodes have only information about their "east" and "west" neighbors' Ethernet addresses in a ring network. Moreover, at the Ethernet level the nodes are not informed that a particular neighbor has failed and has become the "isolated node". (And the proposed method does not require that information be transferred between the SDH layer and the Ethernet layer.) It means that for each particular node, at the Ethernet layer, all other nodes in the network are assigned to belong to either the "west neighbors", or the "east neighbors". A so-called "East-West table" is built at each particular node of the network as a result of a so-called learning process which includes comparing the source addresses of incoming Ethernet packets and destination addresses thereof.

The proposed method deliberately creates misconnections in layer 1, i.e.: on the level of SDH traffic some virtual containers containing data not intended for any of the active nodes, continue traveling in the ring network when one of the nodes becomes an "isolated node". Such misconnections allow preserving all the Ethernet traffic unsquelched for the purpose of protection. However, upon obtaining this profit, a sorting must be provided, i.e.—real misconnections are to be somehow eliminated. The sorting of the data is performed at layer 2 (the layer of Ethernet), by utilizing the termination/ generation operation which is normally performed at all the nodes with respect to the virtual containers carrying Ethernet data.

To ensure the above, additional software means provided to the network manager enable users to select the virtual containers of the SDH/SONET traffic (those carrying Ethernet packets) which are not to be squelched, thus forming the traffic configuration. This traffic configuration is sent by the network manager to the nodes, namely to the additional node software means provided to the embedded software of the nodes. In case MS-SPRING/BLSR requires squelching, the squelching will be provided according to the traffic configuration received by the additional node software means.

In an analogous way, whenever the squelching is required by the MS-SPRING/BLSR, the additional manager software means may ensure that the manager modifies the J1 functionality according to the formed traffic configuration. As a result, the nodes receive from the manager either an instruction to check J1 (by default it is not checked), or a particular code to be inserted in J1 of specific trails—all according to the formed traffic configuration.

FIG. 2 schematically illustrates a two-fiber ring network 30 comprising ADM nodes N1 to N6 connected by fiber links each comprising two fibers. The fibers transmitting traffic in the clockwise direction are marked by even numbers 32, 34, 36, 38, 40, 42. The fibers transmitting traffic in the counter-clockwise direction are indicated by odd numbers 31, 33, 35, 37, 39, 41.

Each node has its "East-West" table at the Ethernet layer (see, for example, the table near the node N4) according to which it selects a direction for dispatching Ethernet data to a required node.

When the network works in its regular way, each of the nodes capable of handling Ethernet data recognizes AU-4 carrying the Ethernet packets, extracts the packets from the AU-4, checks the destination address of every packet, and handles it according to the address. If the packet has the destination address of the node performing the check, it is dropped at this node. If a packet has another destination address, the packet is prepared for being sent to the direction to which its destination address is assigned. As a rule, when a packet comes from East, it is forwarded to West, and vice versa. A packet added at a particular node can be sent in any direction according to its destination address and according to the "West-East" table built in the node. The node then sends each packet to the destination it requires, inside an SDH container leaving the node in the selected direction and assigned for carrying Ethernet data.

Assume that node N3 fails (or there are two fiber cuts in the links 31-32 and 41-42 respectively; actually it is enough that either the two incoming fibers, or the two outgoing fibers of the node be cut).

As a result, the node N3 is considered the "isolated node" by the MS-SPRING system, at the level of SDH. Immediately, by the MS-SPRING, all the SDH traffic is physically redirected at nodes N2 and N4, to form a new ring-like structure which now uses the protective capacity of both fibers of the links, so that part of the traffic in each direction follows according to the main route, and part of the traffic—according to the protective route.

According to the invention, whenever the MS-SPRING system detects the "isolated node" case, it blocks the squelching algorithm with respect to all the AU-4 virtual containers carrying the Ethernet data, and therefore all Ethernet packets will remain in the ring-like structure.

It should be noted that nodes N2 and N4, at the layer of Ethernet, do not recognize that the traffic has been redirected, and each has two incoming directions and two outgoing directions, like any other active node in the network.

It should also be noted that the Ethernet packets are checked from the point of their destination addresses only when they are forwarded via the main route, and are passed "as are" when they use a protective route.

Moreover, it should be kept in mind that at the level of Ethernet, nodes are not informed on the detected "isolated node" i.e., their "East-West" tables remain unchanged.

Now, we will show on specific examples, how the misconnections are eliminated at the Ethernet layer, i.e. how the Ethernet packets generated/terminated at Node 3 can be thrown away.

EXAMPLE 1

A particular Ethernet packet was addressed to node N4, it has arrived to N4 and is dropped to the customer of this node. If another packet is added at node N4 and is to be forwarded to another node (say, node N6), it is forwarded to the direction where that another node is located according to information known to the node N4 (to the East).

If a packet came from node N5 and, according to its destination address, is to be forwarded to node N3 which is now in the state of "isolated node", it will be launched by the node N4 to the West outgoing fiber 31. Since the node N4 output to fiber 31 is connected to the node N4 input from fiber 32, the packet will return to node N4, but via the protective route of the clockwise direction ring (protective capacity of the even-numbered fibers). In this case, the address of the packet is not checked in the nodes and it flows freely up to node N2 where it is again redirected, now back to the main route. At node 42, the packet of the main route will be checked and, as having the destination address N3 will be considered to be sent to the East (see the table of node N2). However, since the packet just arrived from East (and this fact is noted in the node), it should naturally be sent to West. Such a contradiction is considered a condition for destroying this packet.

EXAMPLE 2

A packet sent from node N1 to Node 3 arrives to Node 2, where the traffic is redirected to the protective capacity of the internal ring of the odd-numbered fibers. It is then forwarded up to the node N4 without checking, since nodes just pass such packets through. Node 4, upon redirecting the packet to the main path in the outer ring of even-numbered fibers, recognizes that the direction from which it arrived to the node (from West) is the direction to which the packet is to be sent (see the East-West table of node 4). The packet will then be thrown away.

It should be noted, that the intrinsic Ethernet features, combined with the proposed method, enable throwing away also the Ethernet packets which originated at the isolated node(s).

In a small percentage of faults, namely when isolated sections are created, a number of Ethernet packets may remain circulating in one of such sections, though being intended for another section of the network. This phenomenon is explained by a specific logical configuration of Ethernet rings. Though such packets cause no harm (as a rule, their quantity is relatively low), some additional measures can be taken for eliminating the circulating packets.

It should be noted that, according to the proposed method, all Ethernet packets not related to the isolated node(s) remain in the network, therefore the protection task is fulfilled.

Though the present invention has been described with reference to specific examples, it should be appreciated that other fault situations may occur in the ring network, which could be treated by the proposed method and software product with slight variations that still belong to the scope of the invention.

The invention claimed is:

1. A method for protecting Ethernet data packets transmitted over SDH/SONET traffic in a ring-like optical network formed by a number of nodes, said method comprising:
   utilizing MS-SPRING/BLSR system for SDH/SONET traffic protection,
   detecting at least one isolated node in the network,
   and performing protection of the Ethernet data packets at the SDH/SONET layer by
   preventing initiation of a squelching algorithm of the MS-SPRING/BLSR system with respect to the SDH/SONET virtual containers carrying the data Ethernet packets,
   while ensuring that there is no standardized use of byte J1 in the network, with respect to the SDH/SONET virtual containers carrying the Ethernet packets.

2. The method according to claim 1, wherein the nodes of the network are ADM (Add Drop Multiplexer) nodes.

3. The method according to claim 1, wherein the virtual containers of the SDH/SONET traffic are AU-4/AU-3.

4. The method according to claim 1, wherein a standardized functionality of byte J1 is inactive in the network.

5. The method according to claim 1, comprising filling the J1 bytes of all the virtual containers carrying the Ethernet traffic by one and the same binary code word, thereby preventing the standardized use of the byte J1.

6. The method according to claim 1, further comprising:
   blocking initiation of said squelching algorithm also with respect to the virtual containers of the SDH/SONET traffic not carrying Ethernet packets, and
   ensuring standardized use of byte J1 for the virtual containers not carrying the Ethernet data traffic.

* * * * *